(12) United States Patent
Taki

(10) Patent No.: US 8,040,228 B2
(45) Date of Patent: Oct. 18, 2011

(54) TIRE/WHEEL ASSEMBLY

(75) Inventor: Yuuji Taki, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 671 days.

(21) Appl. No.: 11/658,735

(22) PCT Filed: Jul. 26, 2005

(86) PCT No.: PCT/JP2005/014003
§ 371 (c)(1),
(2), (4) Date: Oct. 16, 2008

(87) PCT Pub. No.: WO2006/011622
PCT Pub. Date: Feb. 2, 2006

(65) Prior Publication Data
US 2009/0027182 A1    Jan. 29, 2009

(30) Foreign Application Priority Data

Jul. 30, 2004  (JP) ................................. 2004-223258
Feb. 15, 2005  (JP) ................................. 2005-037863

(51) Int. Cl.
*B60C 23/00* (2006.01)
(52) U.S. Cl. .......... 340/442; 116/34 R; 152/415; 73/146
(58) Field of Classification Search ................. 340/442, 340/443, 444, 447, 448, 438; 116/34 R; 152/415; 73/146, 146.2
See application file for complete search history.

(56) References Cited

U.S. PATENT DOCUMENTS

| | | | |
|---|---|---|---|
| 5,359,886 A * | 11/1994 | Pradelle | 73/146.2 |
| 2004/0155764 A1* | 8/2004 | Ichinose | 340/447 |
| 2008/0018446 A1* | 1/2008 | Miyamoto | 340/444 |
| 2008/0243327 A1* | 10/2008 | Bujak et al. | 701/29 |
| 2009/0115591 A1* | 5/2009 | Mancosu et al. | 340/447 |

FOREIGN PATENT DOCUMENTS

| | | |
|---|---|---|
| EP | 1 162 089 | 12/2001 |
| JP | 2002 166704 | 6/2002 |
| JP | 2002 187401 | 7/2002 |
| JP | 2002 283801 | 10/2002 |
| JP | 2003-2018 | 1/2003 |
| JP | 2003-205716 | 7/2003 |

\* cited by examiner

*Primary Examiner* — George Bugg
*Assistant Examiner* — Edny Labbees
(74) *Attorney, Agent, or Firm* — Oblon, Spivak, McClelland, Maier & Neustadt, L.L.P.

(57) ABSTRACT

Tire/wheel assemblies that each include a wheel with an air valve mounted thereto and a tire mounted to the wheel, and can each be equipped with an air pressure detecting unit for detecting the air pressure of the tire. A weight balance of the wheel itself is set so that a target barycentric position of the tire/wheel assembly with the air pressure detecting unit deviates from a rotation center of the wheel toward an installation position of the unit by a predetermined amount, and so that a target barycentric position of the tire/wheel assembly without the air pressure detecting unit deviates from the rotation center of the wheel toward the side opposite to the unit installation position by a predetermined amount.

17 Claims, 2 Drawing Sheets

TIRE/WHEEL ASSEMBLY

TECHNICAL FIELD

The present invention relates to a tire/wheel assembly, for example, a tire/wheel assembly used for an automobile. More specifically, the present invention concerns a tire/wheel assembly capable of being equipped with a tire/wheel condition detecting unit for detecting conditions of a tire/wheel assembly (such as the air pressure of a tire and its temperature, the distortion of a wheel, and the like).

BACKGROUND ART

The tire/wheel assembly capable of being equipped with an air pressure detecting unit for detecting the air pressure of a tire is disclosed in, for example, Japanese Unexamined Patent Application Publication No. 2002-283801. In this tire/wheel assembly, the unbalance amount and unbalance range (region within which an unbalance occurs) of the tire/wheel assembly vary depending on whether an air pressure detecting unit is mounted thereon.

In the tire/wheel assembly set forth in the Japanese Unexamined Patent Application Publication No. 2002-283801, counterbalance weight equivalent to the weight of the air pressure detecting unit is provided to a rim section or disc section of the wheel so that the counterbalance weight and the air pressure detecting unit are positioned substantially symmetrically about the rotation center of the wheel (i.e., the rotation center of the tire/wheel assembly), thereby performing a setting such that a target barycentric position (barycentric position in design) of the wheel substantially conforms to the rotation center of the wheel. As a result, in this tire/wheel assembly, the mounting of the air pressure detecting unit onto the wheel, substantially cancels the weight unbalance with respect to the rotation center of the wheel.

However, in the above-described tire/wheel assembly, if the wheel is not equipped with the air pressure detecting unit, there occurs a weight unbalance equivalent to the weight of the air pressure detecting unit because of the counter balance weight provided to the rim section or the disc section of the wheel. As a consequence, the maximum value of a balance weight to be used when making a rotational balance adjustment of the wheel becomes higher than the case where the air pressure detecting unit is mounted on the wheel, by the weight of the air pressure detecting unit. This may make it impossible to properly make a rotational balance adjustment using a small amount of balance weight.

Such a problem can be solved by providing no counter balance weight equivalent to the weight of the air pressure detecting unit, to the rim section or the disc section in a wheel adopted in a tire/wheel assembly without the air pressure detecting unit. However, in this case, besides a wheel for a tire/wheel assembly with the air pressure detecting unit (i.e., a wheel having thereon a counter balance weight equivalent to the weight of the air pressure detecting unit), it is necessary to prepare for a wheel for a tire/wheel assembly without the air pressure detecting unit (i.e., a wheel having thereon no counter balance weight equivalent to the weight of the air pressure detecting unit). This necessitates the manufacturing and managing of two kinds of wheels, thereby causing new problems such as an increase in costs and the like.

DISCLOSURE OF INVENTION

The above-described problems would occur not only in the tire/wheel assemblies capable of being equipped with the air pressure detecting unit for detecting the air pressure of tire, but also in the tire/wheel assemblies capable of being equipped with a tire/wheel condition detecting unit for detecting tire/wheel conditions. With this being the situation, to solve the above-described problems, the present invention provides a tire/wheel assembly capable of being equipped with a tire/wheel condition detecting unit for detecting conditions of a tire/wheel assembly. In this tire/wheel assembly, when it is equipped with the tire/wheel condition detecting unit, a target barycentric position of the tire/wheel assembly is set to deviate from the rotation center of the tire/wheel assembly toward an installation position of the unit, and when the tire/wheel assembly is not equipped with the tire/wheel condition detecting unit, the target barycentric position of the tire/wheel assembly is set to deviate from the rotation center of the tire/wheel assembly toward the side opposite to the unit installation position.

In the tire/wheel assembly according to the present invention, when constructing a tire/wheel assembly with a tire/wheel condition detecting unit and a tire/wheel assembly without the tire/wheel condition detecting unit by adopting tire/wheel assemblies of a single kind (each of the tire/wheel assemblies comprises a wheel and tire) in which assemblies unbalance allowable values are predetermined as being specified values, it is possible to optimize the unbalance amount and unbalance range of each of the tire/wheel assemblies. Specifically, in the tire/wheel assembly with the tire/wheel condition detecting unit, it is possible to deviate the target barycentric position of the tire/wheel assembly from the rotation center of the tire/wheel assembly toward the unit installation position, and thereby deviate the center of unbalance amount and unbalance range (i.e., the center of product variations due to production errors) from the rotation center of the tire/wheel assembly toward the unit installation position. On the other hand, in the tire/wheel assembly without the tire/wheel condition detecting unit, it is possible to deviate the target barycentric position of the tire/wheel assembly from the rotation center of the tire/wheel assembly toward the side opposite to the unit installation position, and thereby deviate the center of unbalance amount and unbalance range from the rotation center of the tire/wheel assembly toward the side opposite to the unit installation position.

In the case where a tire/wheel assembly which has been set so that the target barycentric position thereof substantially conforms to the rotation center thereof when the tire/wheel assembly is not equipped with the tire/wheel condition detecting unit, is equipped with the tire/wheel condition detecting unit (i.e., in the case where the center of unbalance amount and unbalance range deviates from the rotation center of the tire/wheel assembly toward the unit installation position, by an offset amount corresponding to the weight of the tire/wheel condition detecting unit), or in the case where a tire/wheel assembly which has been set so that the target barycentric position of the tire/wheel assembly substantially conforms to the rotation center of the tire/wheel assembly when the tire/wheel assembly is equipped with the tire/wheel condition detecting unit, is not equipped with the tire/Wheel condition detecting unit (i.e., in the case where the center of unbalance amount and unbalance range deviates from the rotation center of the tire/wheel assembly toward the side opposite to the unit installation position, by an offset amount corresponding to the weight of the tire/wheel condition detecting unit), the maximum value of a balance weight to be used when making a rotational balance adjustment of each of the tire/wheel assemblies is relatively high. In comparison with this, the tire/wheel assemblies according to the present invention allow the maximum value of a balance weight to be used when making a rotational balance adjustment of each of the tire/wheel assemblies (a tire/wheel assembly with the tire/wheel condition detecting unit and a tire/wheel assembly without it), to be reduced by, e.g., about half the weight of the tire/wheel condition detecting unit.

Therefore, in the tire/wheel assembly according to the present invention, when attempting to constructing the tire/wheel assembly with a tire/wheel condition detecting unit and a tire/wheel assembly without the tire/wheel condition detecting unit, the adoption of tire/wheel assemblies of a single kind (each of the tire/wheel assemblies comprises a wheel and tire) makes it possible to reduce costs through shared use of components, and properly make a rotational balance adjustment of each of the tire/wheel assemblies using a balance weight with a weight increment reduced (e.g., a balance weight of which the weight increment has been reduced to about half the weight of the tire/wheel condition detecting unit).

In implementing the present invention, it is possible that when the tire/wheel assembly is equipped with the tire/wheel condition detecting unit, the target barycentric position is set to be in the vicinity of a straight line connecting the installation position of the tire/wheel condition detecting unit and the rotation center of the tire/wheel assembly, and when the tire/wheel assembly is not equipped with the tire/wheel condition detecting unit, the target barycentric position is set to be in the vicinity of an extension line of the above-described straight line. This makes it possible to reduce a large unbalance range in the tire/wheel assembly, and reduce the frequency at which balance weight with large weight is adopted when making rotational balance adjustments of each of the tire/wheel assemblies.

Also, in implementing the present invention, it is possible that the offset amount of the target barycentric position toward the unit installation position when the tire/wheel assembly is equipped with the tire/wheel condition detecting unit, is substantially equal to the offset amount of the target barycentric position toward the side opposite to the unit installation position when the tire/wheel assembly is not equipped with the tire/wheel condition detecting unit. That is, it is possible that the above-described offset amount is on a level such that a balance weight having the same weight as the case where the offset amounts of the above-described target barycentric positions are mutually equal, can cope with the offset amount. Also, it is possible that the center of unbalance range when the tire/wheel assembly is equipped with the tire/wheel condition detecting unit, deviates from the rotation center of the tire/wheel assembly to the same extent as the center of unbalance range when the tire/wheel assembly is not equipped with the tire/wheel condition detecting unit so that the unbalance amount when the tire/wheel assembly is equipped with the tire/wheel condition detecting unit becomes substantially equal in level to the unbalance amount when the tire/wheel assembly is not equipped with the tire/wheel condition detecting unit. That is, it is possible that the above-described offset amount is on a level such that a balance weight with the same weight as the case where the above-described offset amounts are mutually equal, can cope with the offset amount.

In this case, it is possible to substantially equalize the maximum value of a balance weight to be used when making a rotational balance adjustment of a tire/wheel assembly with the tire/wheel condition detecting unit to the maximum value of a balance weight to be used when making a rotational balance adjustment of the tire/wheel assembly without the tire/wheel condition detecting unit, and also it is possible to limit the weight of the balance weight to be used when making a rotational balance adjustment of each of the tire/wheel assemblies, to a small value (small value on the level of the sum of an unbalance allowable value of the tire/wheel assembly except for the tire/wheel condition detecting unit, and about half the weight of the tire/wheel condition detecting unit).

BEST MODE FOR CARRYING OUT THE INVENTION

Figure 1A:
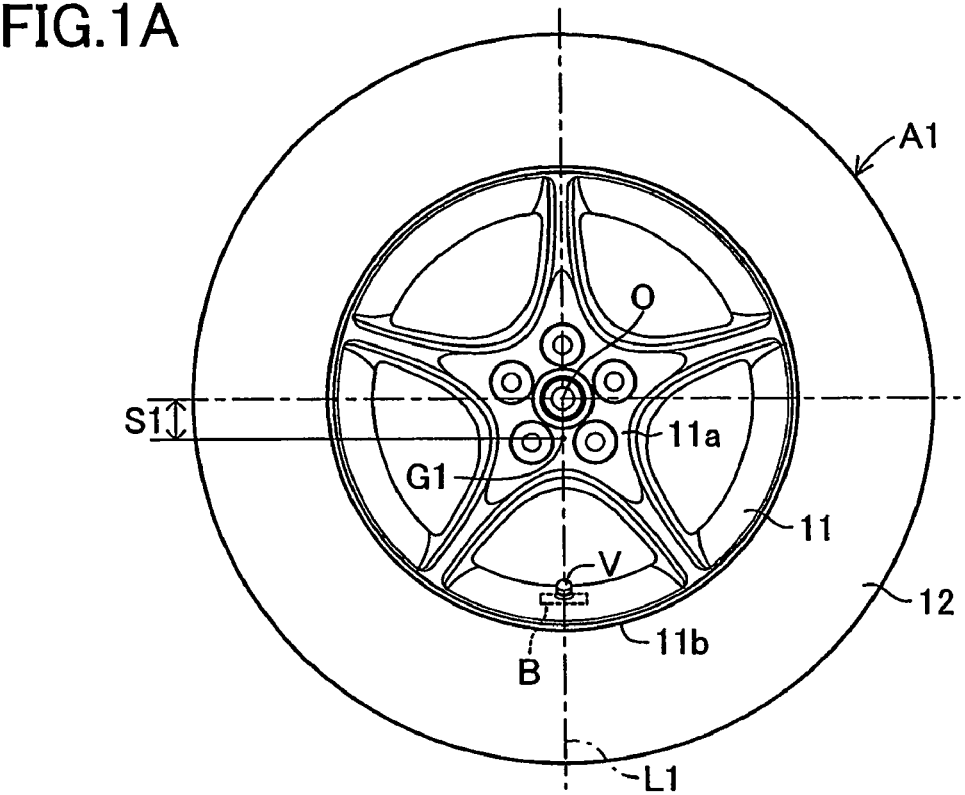
FIGS. 1A and 1B are schematic side views of tire/wheel assemblies according to an embodiment of the present invention.
Figure 1B:
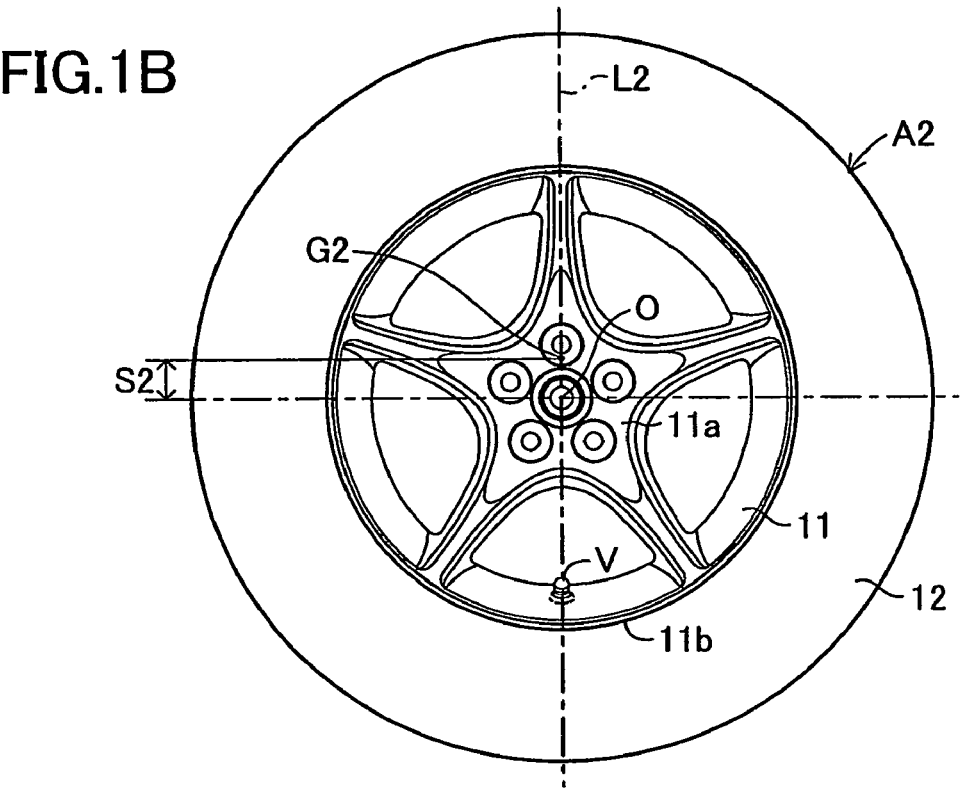

Hereinafter, an embodiment according to the present invention will be described with the accompanying drawings. FIGS. 1A and 1B show tire/wheel assemblies A1 and A2, respectively. Each of the tire/wheel assemblies A1 and A2 includes a wheel 11 mounted to a hub (not shown) at a disc section 11a, and a tire 12 mounted to a rim section 11b of the wheel 11. To the rim section 11b of the wheel 11, an air valve V for supplying air into the tire 12 is mounted.

The wheels 11 and tires 12 of the tire/wheel assemblies A1 and are wheels of a single kind and tires of a single kind, respectively, although having product variations due to production errors. Here, an unbalance allowable value (the maximum value of allowable unbalance amounts) of the wheel 11 including the valve V is predetermined as a specified value C1 [g], and an unbalance allowable value of the tire 12 is predetermined as a specified value C2 [g].

In the tire/wheel assembly A1 shown in FIG. 1A, an air pressure detecting unit-B is integrally mounted to the air valve V, and thus the tire/wheel assembly A1 is referred to as a tire/wheel assembly with an air pressure detecting unit. On the other hand, in the tire/wheel assembly A2 shown in FIG. 1B, no air pressure detecting unit B is mounted to the air valve V, and thus the tire/wheel assembly A2 is referred to as a tire/wheel assembly without air pressure detecting unit.

The air pressure detecting unit B detects at least the air pressure of the tire 12, and outputs, by radio, the detected signals from a transmitter (not shown) incorporated in the air pressure detecting unit B to a receiver (not shown) mounted to a vehicle body. The air pressure detecting unit B itself is known, and incorporates a battery (not shown), as well. The weight of the air pressure detecting unit B itself is predetermined as being W [g].

In this embodiment, as exaggeratedly shown in FIG. 1A, the weight balance of the wheel 11 itself including the air valve V is set so that the target barycentric position G1 of the tire/wheel assembly A1 with the air pressure detecting unit B is located in the vicinity of a straight line L1 connecting the installation position of the air pressure detecting unit B and the rotation center O of the wheel 11 (i.e., the rotation center of the tire/wheel assembly), and that it deviates from the rotation center O of the wheel 11 toward the side of the unit installation position by a predetermined amount S1. On the other hand, as exaggeratedly shown in FIG. 1B, the weight balance of the wheel 11 itself including the air valve V is set so that the target barycentric position G2 of the tire/wheel assembly A2 without the air pressure detecting unit B is located in the vicinity of an extension line L2 of the above-described straight line L1, and that it deviates from the rotation center O of the wheel 11 toward the side opposite to the unit installation position by a predetermined amount S2 (which is substantially equal to the above-described S1).

The above-described offset amounts (the predetermined amounts S1 and S2) are set in a balanced manner allowing for the weight W [g] of the air pressure detecting unit B. Thereby, the center (center of product variations) of a circle (see a solid line in FIG. 2) indicating the distribution range of unbalance amounts (their maximum amount is (C1+C2)) in the tire/wheel assembly A1 with the air pressure detecting unit B, deviates from the rotation center O of the wheel 11 toward the unit installation position by a set amount D1. On the other hand, the center of a circle (see a dashed line in FIG. 2) indicating the distribution range of unbalance amounts (their maximum amount is (C1+C2)) in the tire/wheel assembly A2 without the air pressure detecting unit B, deviates from the rotation center O of the wheel 11 toward the side opposite to unit installation position by a set amount D2. The above-described set amount D1 is an amount about half the weight W [g] of the air pressure detecting unit B, and substantially equal to the set amount D2.

In this embodiment with above-described arrangements, wheels 11 of a single kind in each of which an unbalance allowable value of the weight including the air valve V is predetermined as being the specified value C1 [g], and tires 12 of a single kind in each of which an unbalance allowable value of the weight is predetermined as being the specified value C2 [g], are adopted, and thereby the tire/wheel assembly A1 with the air pressure detecting unit B and the tire/wheel assembly A2 without the air pressure detecting unit B are constructed (manufactured), the maximum unbalance amount that is allowable when manufacturing each of the tire/wheel assemblies A1 and A2 being (C1+C2).

When constructing the tire/wheel assemblies A1 and A2, settings are performed such that the unbalance amount and unbalance range of each of the tire/wheel assemblies A1 and A2 is optimized. Specifically, in the tire/wheel assembly A1 with the air pressure detecting unit B, a setting is performed such that the target barycentric position G1 of the tire/wheel assembly A1 deviates from the rotation center O of the wheel 11 toward the unit installation position by the predetermined amount S1 so that the center of the circle (see the solid line in FIG. 2) indicating the distribution range of unbalance amounts deviates from the rotation center O of the wheel t1 toward the unit installation position by the set amount D1. On the other hand, in the tire/wheel assembly A2 without the air pressure detecting unit B, a setting is performed such that the target barycentric position G2 of the tire/wheel assembly A2 deviates from the rotation center O of the wheel 11 toward the side opposite to the unit installation position by the predetermined amount S2 so that the center of the circle (see the dashed line in FIG. 2) indicating the distribution range of unbalance amounts deviates from the rotation center O of the wheel 11 toward the side opposite to the unit installation position by the set amount D2.

In the case where a tire/wheel assembly that has been set so that the target barycentric position thereof substantially conforms to the rotation center of the wheel when the tire/wheel assembly is not equipped with the air pressure detecting unit B, is equipped with the air pressure detecting unit B by mistake (that is, in the case where the center of unbalance amount and unbalance range deviates from the rotation center of the wheel 11 toward the unit installation position, by an offset amount corresponding to the weight of the air pressure detecting unit B), or in the case where a tire/wheel assembly that has been set so that the target barycentric position thereof substantially conforms to the rotation center of the wheel when the tire/wheel assembly is equipped with the air pressure detecting unit B, is not equipped with the air pressure detecting unit B by mistake, (that is, in the case where the center of the unbalance amount and unbalance range deviates from the rotation center of the wheel 11 toward the side opposite to the unit installation position, by an offset amount corresponding to the weight of the air pressure detecting unit B), the maximum value of a balance weight to be used when making a rotational balance adjustment of each of the tire/wheel assemblies is (C1+C2+W). In comparison with this, the tire/wheel assemblies A1 and A2 according to the present invention allow the maximum value (C1+C2+W/2) of a balance weight to be used when making a rotational balance adjustment of each of the tire/wheel assemblies A1 and A2, to be reduced by about half the weight W [g] of the air pressure detecting unit B.

In this embodiment, therefore, when constructing the tire/wheel assembly A1 with the air pressure detecting unit B and the tire/wheel assembly A2 without the air pressure detecting unit B, it is possible to use the wheels 11 of a single kind and tires 12 of a single kind to reduce costs through shared use of components, as well as properly make a rotation balance adjustment of the tire/wheel assemblies A1 and A2 using a balance weight with a weight increment reduced (a balance weight of which the maximum increment has been reduced by about half the weight W [g] of the air pressure detecting unit B, as compared with the above-described comparative examples).

Figure 2:
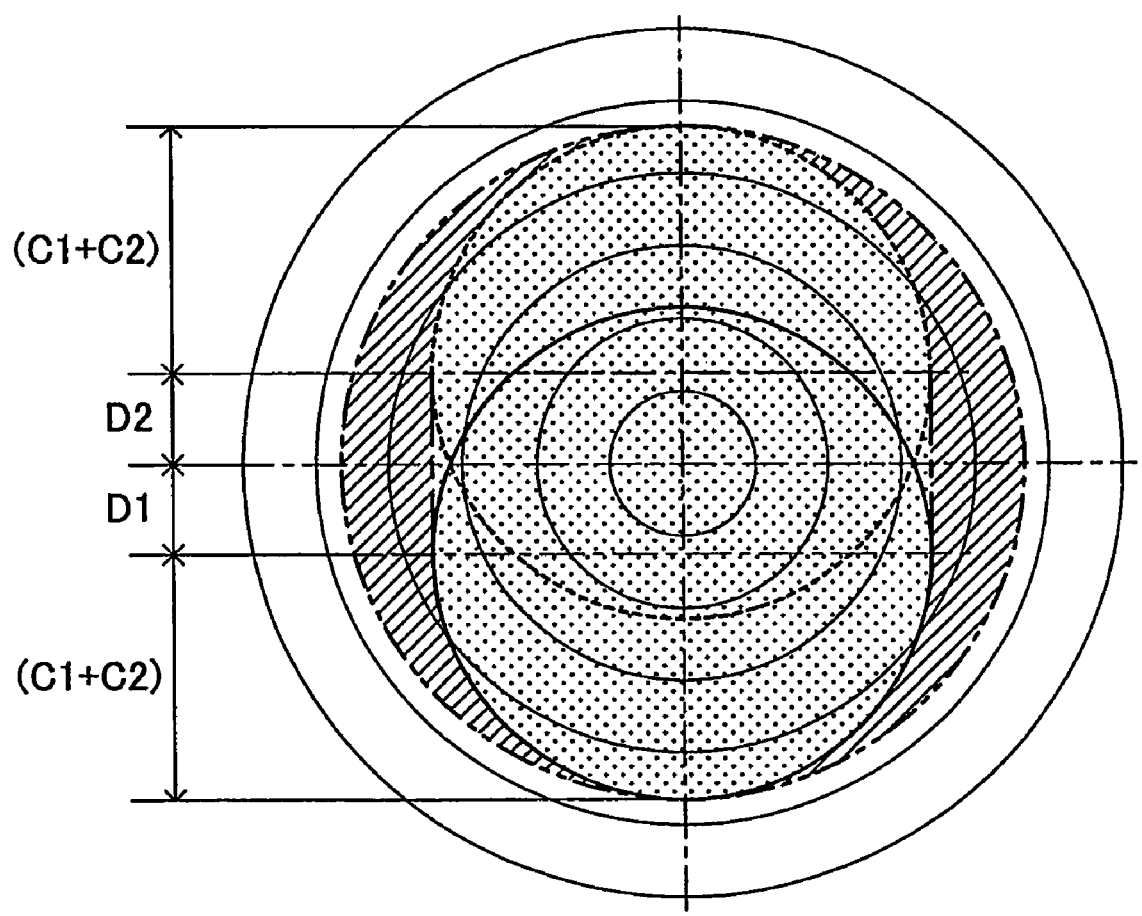
FIG. 2 is a diagram showing the unbalance amount and unbalance range of each of the tire/wheel assemblies illustrated in FIG. 1.

Furthermore, in this embodiment, as shown in FIGS. 1A and 1B, the target barycentric positions G1 and G2 of the tire/wheel assemblies A1 and A2, respectively, are set to be in the vicinity of the straight line L1 connecting the installation position of the air pressure detecting unit B and the rotation center O of wheel 11, and in the vicinity of the extension line L2 of the above-described straight line L1. This makes it possible to reduce a large unbalance range in the tire/wheel assemblies A1 and A2 as compared with a range encircled with a chain double-dashed line in FIG. 2, by a range indicated by oblique lines in FIG. 2, and reduce the frequency at which large balance weight are adopted when making adjustments of rotational balances of the tire/wheel assemblies A1 and A2. Here, the range encircled by the chain double-dashed line in FIG. 2 is an unbalance range in the case where a setting is performed such that the target barycentric positions G1 and G2 of the tire/wheel assemblies A1 and A2, respectively, do not need to be in the vicinity of the straight line L1, and in the vicinity of the extension line L2 of the above-described straight line L1.

Moreover, in this embodiment, the offset amount (S1) of the target barycentric position G1 toward the unit installation position when the tire/wheel assembly is equipped with the air pressure detecting unit B, is set to be substantially equal to the offset amount (S2) of the target barycentric position G2 toward the side opposite to the unit installation position when the tire/wheel assembly is not equipped with the air pressure detecting unit B. That is, the center of an unbalance range when the tire/wheel assembly is equipped with the air pressure detecting unit B deviates from the rotation center O of the tire/wheel assembly to the same extent as the center of an unbalance range when the tire/wheel assembly is not equipped with the air pressure detecting unit B so that the unbalance amount when the tire/wheel assembly is equipped with the air pressure detecting unit B becomes substantially equal in level to the unbalance amount when the tire/wheel assembly is not equipped with the air pressure detecting unit B.

It is therefore possible to substantially equalize the maximum value of a balance weight to be used when making a rotational balance adjustment of a tire/wheel assembly A1 with the air pressure detecting unit B to the maximum value of a balance weight to be used when making a rotational balance adjustment of the tire/wheel assembly A2 without the air pressure detecting unit B, and also it is possible to limit the weight of the balance weight to be used when making a rotational balance adjustment of each of the tire/wheel assemblies A1 and A2 to a small value (small value on the level of the sum of unbalance allowable value (C1+C2) of the tire/wheel assembly except for the air pressure detecting unit B, and about half the weight of the tire/wheel assembly, that is, (C1+C2+W/2)).

Specifically, the balance weight to be used when making a rotational balance adjustment of each of the tire/wheel assemblies A1 and A2 is set in increments of 2.5 to 5.0 [g]. Accordingly, if the maximum value (C1+C2) of unbalance amount allowable for each of the tire/wheel assemblies A1 and A2 is, e.g., 35 [g], and the weight W [g] of the air pressure detecting unit B is, e.g., 23 [g], when an adjustment of rotational balance of each of the tire/wheel assemblies A1 and A2 in which adjustment the unbalance amount allowable for each of the tire/wheel assemblies A1 and A2 is the maximum allowable value, is made using a balance weight having the minimum weight of 5.0 [g] and being set in an increment of 5.0 [g], the above-described maximum value (C1+C2+W/2) becomes 46.5 [g], so that a balance weight of 45.0 [g] close to this value 46.5 [g] is used. In contrast, in each of the above-described comparative examples, because the above-described maximum value (C1+C2+W) becomes 58 [g], a balance weight of 60.0 [g] close to this value 58 [g] is used.

In this specific embodiment, the maximum value of a balance weight to be used when making a rotational balance adjustment of each of the tire/wheel assemblies A1 and A2 remains at 45.0 [g] before the above-described maximum value (C1+C2+W) becomes 47.5 [g], and hence, even if the wheel 11 is designed so that the unbalance center of the wheel 11 becomes ±2.5 [g] with respect to a target value (the position where the offset amounts S1 and S2 become equal to each other), the used balanced weight is subjected to little effect, whereby a balance weight with the same weight (the maximum value: 45.0 [g]) is adaptable for the adjustment of rotational balance. On the other hand, it is possible to provide the target value of unbalance center of the wheel 11 with an allowable range of 2.5 [g], and thereby enhance the manufacturing efficiency of the wheel 11.

In the above-described embodiment, by appropriately setting the weight balance of the wheel 11 itself, a setting has been performed such that, when the tire/wheel assembly A1 is equipped with the air pressure detecting unit B, the target barycentric position G1 of the tire/wheel assembly A1 deviates from the rotation center O of the wheel 11 toward the unit installation position by the predetermined amount S1, and that, when the tire/wheel assembly A2 is not equipped with the air pressure detecting unit B, the target barycentric position G2 of the tire/wheel assembly A2 deviates from the rotation center O of the wheel 11 toward the side opposite to the unit installation position by the predetermined amount S2. However, the set values of the above-described offset amounts (S1 and S2) may be increased or decreased as appropriate, and also the present invention may be implemented so that the target barycentric positions (G1 and G2) are set by appropriately setting the weight balance of the tire 12 itself as in the case of the above-described embodiment.

Also, in the above-described embodiment, the case in which the air pressure detecting unit B is integrally mounted to the air valve V, which is mounted t6 the rim section 11b of the wheel 11, has been taken as an example. However, the present invention may be implemented by constructing the air pressure detecting unit B so as to be integrally mounted to the wheel 11, or integrally mounted to (embedded in) the tire 12, instead of being integrally mounted to the air valve V. Even when the air pressure detecting unit B is mounted to (embedded in) the tire 12, the present invention may also be implemented so that the target barycentric positions (G1 and G2) are set as in the case of the above-described embodiment by appropriately setting the weight balance of the wheel 11 itself as is the case with the above-described embodiment, or by appropriately setting the weight balance of the tire 12 itself.

In the above-described embodiment, the case in which the detecting unit mounted to the wheel or tire is an air pressure detecting unit for detecting the air pressure of a tire, has been taken as an example. However, the detecting unit to be mounted to the wheel or tire is not limited as long as the detecting unit is a tire/wheel condition detecting unit for detecting conditions of a tire/wheel assembly (such as the temperature of a tire, the distortion of a wheel, and the like).

The invention claimed is:

1. A tire/wheel assembly selectively equipped with a tire/wheel condition detecting unit that detects conditions of the tire/wheel assembly,
    wherein, when the tire/wheel assembly is equipped with the tire/wheel condition detecting unit, a target barycentric position of the tire/wheel assembly deviates from a rotation center of the tire/wheel assembly toward an installation position of the tire/wheel condition detecting unit;
    wherein, when the tire/wheel assembly is not equipped with the tire/wheel condition detecting unit, the target barycentric position of the tire/wheel assembly deviates from the rotation center of the tire/wheel assembly toward a side of the tire/wheel assembly opposite to the installation position of the tire/wheel condition detecting unit.

2. The tire/wheel assembly according to claim 1,
    wherein, when the tire/wheel assembly is equipped with the tire/wheel condition detecting unit, the target barycentric position is set to be in the vicinity of a straight line connecting the installation position of the tire/wheel condition detecting unit and the rotation center of the tire/wheel assembly, and
    wherein, when the tire/wheel assembly is not equipped with the tire/wheel condition detecting unit, the target barycentric position is set to be in the vicinity of an extension line of said straight line.

3. The tire/wheel assembly according to claim 1, wherein an offset amount of the target barycentric position toward the unit installation position when the tire/wheel assembly is equipped with the tire/wheel condition detecting unit, is substantially equal to an offset amount of the target barycentric position toward the side opposite to the unit installation position when the tire/wheel assembly is not equipped with the tire/wheel condition detecting unit.

4. The tire/wheel assembly according to claim 1, wherein a center of an unbalance range when the tire/wheel assembly is equipped with the tire/wheel condition detecting unit deviates from the rotation center of the tire/wheel assembly to the same extent as a center of an unbalance range when the tire/wheel assembly is not equipped with the tire/wheel condition detecting unit so that an unbalance amount when the tire/wheel assembly is equipped with the tire/wheel condition detecting unit becomes substantially equal in level to an unbalance amount when the tire/wheel assembly is not equipped with the tire/wheel condition detecting unit.

5. The tire/wheel assembly according to claim 1,
wherein the target barycentric position of the tire/wheel assembly deviates from the rotation center of the tire/wheel assembly by setting a target barycentric position of a wheel of the tire/wheel assembly to deviate from a rotation center of the wheel.

6. The tire/wheel assembly according to claim 2, wherein an offset amount of the target barycentric position toward the unit installation position when the tire/wheel assembly is equipped with the tire/wheel condition detecting unit, is substantially equal to an offset amount of the target barycentric position toward the side opposite to the unit installation position when the tire/wheel assembly is not equipped with the tire/wheel condition detecting unit.

7. The tire/wheel assembly according to claim 2, wherein a center of an unbalance range when the tire/wheel assembly is equipped with the tire/wheel condition detecting unit deviates from the rotation center of the tire/wheel assembly to the same extent as a center of an unbalance range when the tire/wheel assembly is not equipped with the tire/wheel condition detecting unit so that an unbalance amount when the tire/wheel assembly is equipped with the tire/wheel condition detecting unit becomes substantially equal in level to an unbalance amount when the tire/wheel assembly is not equipped with the tire/wheel condition detecting unit.

8. The tire/wheel assembly according to claim 2,
wherein the target barycentric position of the tire/wheel assembly deviates from the rotation center of the tire/wheel assembly by setting a target barycentric position of a wheel of the tire/wheel assembly to deviate from a rotation center of the wheel.

9. The tire/wheel assembly according to claim 3,
wherein the target barycentric position of the tire/wheel assembly deviates from the rotation center of the tire/wheel assembly by setting a target barycentric position of a wheel of the tire/wheel assembly to deviate from a rotation center of the wheel.

10. The tire/wheel assembly according to claim 4,
wherein the target barycentric position of the tire/wheel assembly deviates from the rotation center of the tire/wheel assembly by setting a target barycentric position of a wheel of the tire/wheel assembly to deviate from a rotation center of the wheel.

11. The tire/wheel assembly according to claim 6,
wherein the target barycentric position of the tire/wheel assembly deviates from the rotation center of the tire/wheel assembly by setting a target barycentric position of a wheel of the tire/wheel assembly to deviate from a rotation center of the wheel.

12. The tire/wheel assembly according to claim 7,
wherein the target barycentric position of the tire/wheel assembly deviates from the rotation center of the tire/wheel assembly by setting a target barycentric position of a wheel of the tire/wheel assembly to deviate from a rotation center of the wheel.

13. The tire/wheel assembly according to claim 1, wherein the tire/wheel condition detecting unit is an air pressure detecting unit that detects an air pressure of the tire/wheel assembly.

14. The tire/wheel assembly according to claim 3, wherein the offset amount of the target barycentric position toward the installation position of the tire/wheel condition detecting unit from the rotation center of the tire/wheel assembly when the tire/wheel assembly is equipped with the tire/wheel condition detecting unit, corresponds to a weight of the tire/wheel condition detecting unit.

15. The tire/wheel assembly according to claim 4, wherein the tire/wheel condition detecting unit is an air pressure detecting unit that detects an air pressure of the tire/wheel assembly.

16. The tire/wheel assembly according to claim 4, wherein the center of the unbalance range when the tire/wheel assembly is equipped with the tire/wheel condition detecting unit deviates from the rotation center of the from the rotation center in correspondence with a weight of the tire/wheel condition detecting unit.

17. The tire/wheel assembly according to claim 4,
wherein the center of the unbalance range when the tire/wheel assembly is equipped with the tire/wheel condition detecting unit deviates from the rotation center of the tire/wheel assembly by a predetermined unbalance amount, and
wherein the center of the unbalance range when the tire/wheel assembly is not equipped with the tire/wheel condition detecting unit deviates from the rotation center of the tire/wheel assembly by the predetermined unbalance amount.

* * * * *